United States Patent [19]

Ohtsuga et al.

[11] 4,346,922

[45] Aug. 31, 1982

[54] DEVICE FOR PREVENTING LEAKAGE AT PIPE JOINTS

[76] Inventors: Hisao Ohtsuga, 5-26, Kamiosaki 4-chome, Shinagawa-ku, Tokyo, Japan, 141; Koji Uzawa, 4-8, Hibarigaoka Kita 2-chome, Hoya city, Tokyo, Japan, 188; Takashi Kamuro, 34-18, Nishimachi 5-chome, Kokubunji city, Tokyo, Japan, 185; Susumu Sudo, 2670, Kami-iida, Totsuka-ku, Yokahama city, Kanagawa Pref., Japan, 245; Tomoyoshi Hirose, 13-2, Kyomachi 2-chome, Kawasaki-ku, Kawasaki city, Kanagawa Pref., Japan, 210; Masafumi Miyao, 16-4-1413, Harumi 3-chome, Chuo-ku, Tokyo, Japan, 104; Motoyuki Koga, 9-18, Nakamachi 1-chome, Meguro-ku, Tokyo, Japan, 153

[21] Appl. No.: 132,543

[22] Filed: Mar. 21, 1980

[51] Int. Cl.³ .............................................. F16L 21/00
[52] U.S. Cl. ...................................... 285/109; 138/97; 285/370; 285/DIG. 16; 285/110
[58] Field of Search ....... 285/109, 373, 397, DIG. 16, 285/15, 370, 371, 337, 110; 138/97

[56] References Cited

U.S. PATENT DOCUMENTS

| 2,014,313 | 9/1935 | Damsel | 285/109 |
|---|---|---|---|
| 2,977,994 | 4/1961 | Xenis | 285/370 X |
| 3,070,130 | 12/1962 | Risley | 138/97 |
| 3,508,766 | 4/1970 | Kessler et al. | 285/370 X |
| 3,704,564 | 12/1972 | Koga . | |
| 4,194,750 | 3/1980 | Sovish et al. | 285/DIG. 16 X |

FOREIGN PATENT DOCUMENTS

| 2102520 | 8/1971 | Fed. Rep. of Germany | 285/109 |
|---|---|---|---|
| 2063110 | 6/1972 | Fed. Rep. of Germany | 285/370 |
| 2814497 | 10/1979 | Fed. Rep. of Germany | 285/370 |
| 78014 | 5/1955 | Netherlands | 285/109 |
| 1200225 | 7/1970 | United Kingdom . | |

Primary Examiner—Thomas F. Callaghan
Attorney, Agent, or Firm—Wenderoth, Lind & Ponack

[57] ABSTRACT

This device comprises a cylindrical member integrally made of an elastic material for covering the inside periphery of a pipe joint, belt members impregnated with a bonding agent to be squeezed out by pressure, and circular expanding members for expanding said cylindrical member when positioned inside the cylindrical member and subsequently expanded. The respective belt members are wound around the outside peripheral surface of the cylindrical member at its longitudinal ends and the respective expanding members are brought into contact with the inside peripheral surface of the cylindrical member at both its longitudinal ends, so that by radially expanding the cylindrical member at both its longitudinal ends by the respective expanding members, the respective belt members are pressed against the inside peripheral portions of the pipes on both sides of the joint for squeezing out the bonding agent from the belt members by such pressure and thereby attaining an airtight and watertight bonding between the outside peripheral surface of the cylindrical member at both its longitudinal ends and the inside peripheral surfaces of the pipes.

11 Claims, 15 Drawing Figures

DEVICE FOR PREVENTING LEAKAGE AT PIPE JOINTS

The present invention relates to a device for preventing leakage of fluid from a joint of large diameter pipes such as gas mains and water mains, by fitting a cylindrical member inside the peripheral surface of the joint.

At joints of gas mains, etc., an airtight connection is made by various known means. For example, when a large-scale earthquake occurs, joined pipes can axially separate or can bend at the joint, thereby breaking the airtight connection causing gas to leak from the joint. Pipes buried underground become loose at their joints due to ground movement, etc. after a long period of time, and this also can cause gas, etc. to leak from the joints. For this reason, for pipe joints of gas mains, etc., a device for substantially preventing leakage is desired which is not affected by large-scale earthquakes or ground movement which naturally occurs over long periods of time.

A device for preventing leaks at the joints of pipes, for example the device as disclosed in UK Pat. No. 1200225, prevents leaks at a joint by fitting a sleeve made of an elastic material inside the joint. This device prevents leaks by the formation of protrusions around the outside peripheral surface of the sleeve, so that by expanding said sleeve outwardly by a clamp member, said protrusions may be pressed to the inside peripheral surfaces of the pipes at their joint. However, an earthquake or normal ground movement can cause the pipes to axially separate or are bent at the joint causing the protrusions which prevent leakage, via the sealed portions, to slide along the inside peripheral surfaces of pipes, thereby reducing the sealing effect, or the protrusions can separate from the pipes thereby causing a large outflow of gas.

SUMMARY OF THE INVENTION

The object of the present invention is to provide a device for preventing leaks at a joint of pipes which can prevent the leakage of fluid such as gas flowing in the pipes even when the pipes axially separate or are bent by an earthquake or ground movement over a long period of time, etc.

To attain this object, the device for preventing leaks at a joint of pipes comprises a cylindrical member integrally made of an elastic material for covering the inner peripheral surfaces of a joint of pipes, belt members impregnated with a bonding agent to be squeezed out by pressure, and circular expanding members for expanding said cylindrical member, which are positioned inside of said cylindrical member.

Said respective belt members are wound around the outside peripheral surface of said cylindrical member at its both longitudinal ends and said respective expanding members are brought into contact with the inside peripheral surface of said cylindrical member at both its ends, so that by expanding said cylindrical member radially outwardly at both the ends by said respective expanding members, said respective belt members may be pressed against the inside peripheral surfaces of the pipes on both sides of said joint for squeezing the bonding agent from said belt members by such pressure, thereby attaining airtight and watertight bonding between the outside peripheral surface of the cylindrical member at both longitudinal ends and the inside peripheral surfaces of the pipes.

The present invention has an effect that the leakage of flowing fluid can be prevented without lowering the sealing effect because the cylindrical member covering the inner peripheral surface of the joint of pipes is bonded at both its longitudinal ends to the inside peripheral surface of both the pipes in airtight and watertight condition, thereby not allowing these sealed portions to move, thereby causing only the intermediate portion of the cylindrical member to elastically deform for absorbing the bending or axial movement of the joint.

Furthermore, in the present invention, the bonding of the outside peripheral surface of the cylindrical member at both the longitudinal ends to the inside peripheral surfaces of pipes is attained by applying pressure to the belt members impregnated with a bonding agent by way of expanding the cylindrical member, thereby squeezing the bonding agent from the belt members. Therefore, the present invention accomplishes reliable and even bonding. Thus, the present invention achieves the objective of very definite and sophisticated leakage prevention at a joint of pipes, and is reliable and easy to assemble.

BRIEF DESCRIPTION OF THE DRAWINGS

The present invention is described below in more detail in reference to the drawings showing preferable embodiments.

FIG. 1 shows a first embodiment of the present invention.

FIG. 2 shows a second embodiment of the present invention.

FIG. 3 shows a third embodiment of the present invention.

FIG. 4 shows a fourth embodiment of the present invention.

DETAILED DESCRIPTION OF THE INVENTION

Figure 5:
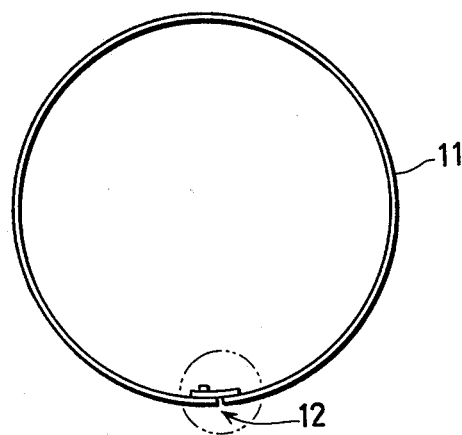
FIG. 5 is a front view showing an embodiment of an expanding member of the leak preventing device of the present invention.
Figure 6A:
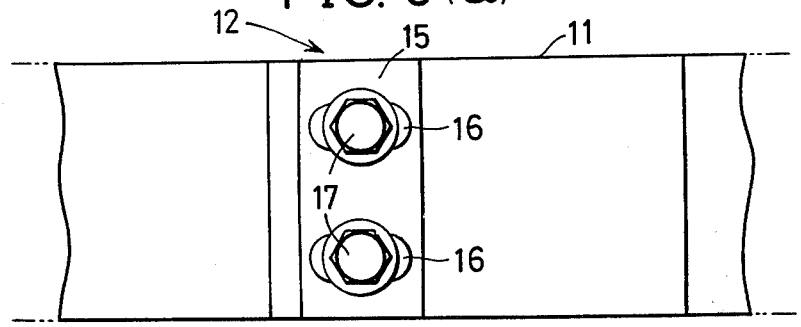
FIG. 6(a) is an enlarged plan view of the clamping arrangement encircled by the dotted line in FIG. 5.
Figure 6B:
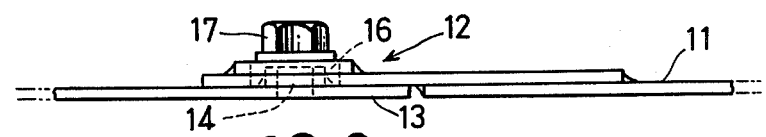
FIG. 6(b) is a side view of the clamping arrangement shown in FIG. 6(a).
Figure 6C:
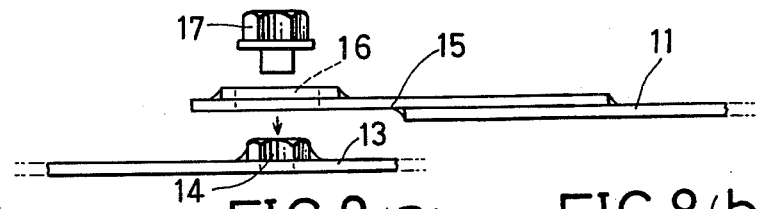
FIG. 6(c) is an illustration of the clamping arrangement of FIG. 6(b) disassembled.

In FIGS. 1 to 4 to show embodiments of the present invention, symbols 1 and 2 show large diameter cast iron pipes laid underground for example as a gas main. Said cast iron pipes 1 and 2 are connected in an airtight state at a joint 3', by fitting for example square rubber 4, lead 5 and hemp 6 between both the pipes at a joint portion 3 and subsequently clamping together both the pipes 1 and 2 by bolts 7. However, for the structure of the joint portion 3, any other known connection method can be applied. Symbol 8 shows the leak preventing device of the present invention which is positioned inside the joint portion 3 of the pipes 1 and 2, so as to prevent leakage from said joint portion 3. Said leak preventing device 8 comprises a cylindrical member 9 integrally made of a proper elastic material such as synthetic rubber, to cover the inner periphery of the joint 3' of the pipes 1 and 2, belt members 10 impregnated with a bonding agent to be squeezed out by pressure, and circular expanding members 11 for expanding said cylindrical member 9 when the expanding members are positioned against the inner peripheral surface of the cylindrical member 9 and subsequently radially expanded. The material of said cylindrical member 9 can be synthetic rubber or any other proper elastic material. Preferable examples of the belt materials 10 are continuous foamed materials such as urethane sponge, but any other material can be used, so long as it can be impregnated with a bonding agent and allows the bonding agent to be squeezed out by pressure and is chemically stable with respect to said bonding agent. Furthermore, while belt single members with rectangular section are used in the embodiments, each member can consist of plural materials with the sectional form being properly selected. A preferable example of the bonding agent is epoxy resin hardened at room temperature, but any other proper bonding agent can be used. An example of the expanding member 11 is shown in FIGS. 5 and 6. The expanding member 11 illustrated is a belt metal sheet formed in the shape of a ring. In the overlapped portion of both the ends of the metal sheet, nuts 14, provided at one end 13, are fitted around oblong holes 16 provided in the other end 15, and both the ends are clamped and fixed by bolts 17. With this arrangement the ring diameter can be finely adjusted in the range of the length of said oblong holes 16.

Figure 1A:
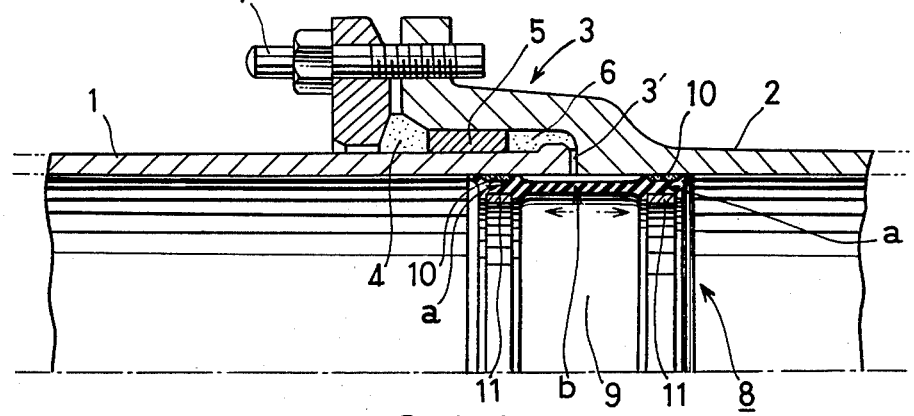
FIG. 1(a) is a longitudinal sectional view showing the leak preventing device operatively positioned at the joint of two pipes.
Figure 1B:
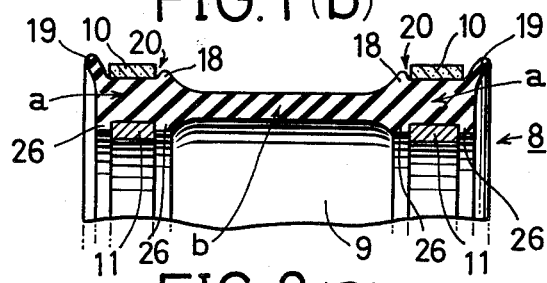
FIG. 1(b) is a longitudinal sectional view showing the leak preventing device only.

Based on this structure, the composition and operation of the first embodiment of the present invention shown in FIG. 1 are described in further detail below. In the first embodiment, longitudinal inside and outside radial protrusions 18 and 19 are formed around the cylindrical member 9 at both the ends a,a to respectively form annular grooves 20 which receive said beltlike members 10 around said cylindrical member 9 at both ends. The diameters of said longitudinal inside and outside protrusions 18 and 19 are a little larger than the inside diameter of said pipes 1 and 2, so that, as described later, when said belt members 10 are pressed against the inside surfaces of said pipes 1 and 2 by said expanding members 11, the longitudinal inside and outside protrusions 18 and 19, too, may be pressed against the inside surfaces of the pipes 1 and 2. Furthermore, in the first embodiment the radial wall thickness of an intermediate portion b of said cylindrical member 9 is thinner than the radial wall thickness of both the ends a,a so that said intermediate portion b is more susceptible to elastic deformation than both the ends a and a.

Figure 8A:
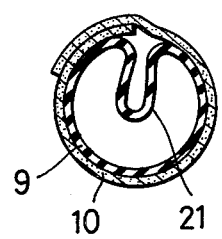
FIG. 8(a) is an illustration showing an example of a belt member impregnated with a bonding agent and wound around the cylindrical member before the cylindrical member is radially expanded with a joint.

The leak preventing device 8 thus comprised is positioned inside the joint portion 3, for example, as described below. At first, the worker deforms the cylindrical member 9 to form an inside loop 21, as shown in FIG. 8(a), thus decreasing the diameter of the member 9 and winds the belt members 10 impregnated with a bonding agent around the grooves 20 on the outside surface of said said cylindrical member 9 at both the ends a and a. In this case, since the cylindrical member 9 is deformed to decrease the diameter thereof, each of the belt members 10 is overlapped at both the ends. Though said beltlike members 10 are impregnated with a bonding agent, the bonding agent does not ooze unnecessarly since pressure is not applied thus allowing the work to be achieved easily. Referring to FIG. 8(a), both the ends of the belt member 10 are overlapped and lightly adhere to each other due to the bonding agent slight oozing, therefore the deformed state of the cylindrical member 9 is held.

Then the cylindrical member 9 and the belt members 10 are positioned by the worker into the joint portion 3 of the pipes 1 and 2, and one end a of one side of said cylindrical member 9 is fitted into the pipe 1 on one side of the joint 3', while the other end a of the other side is fitted into the pipe 2 on the other side of the joint 3'. Thus, both the belt members 10 are respectively fitted into the insides of the pipes 1 and 2. However, before this operation, the inside portions of the pipes 1 and 2 where the leak preventing device of the present invention is positioned should be pretreated by grinding, chemical cleaning or any other predetermined method.

Figure 7:
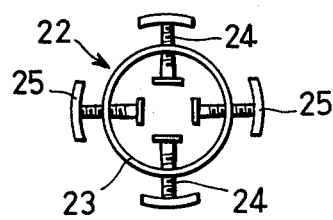
FIG. 7 is a front view showing an example of a tool for expanding the expanding member of the present invention.
Figure 8B:
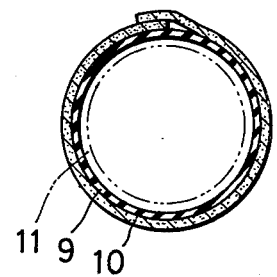
FIG. 8(b) is an illustration showing the state where the expanding member is partially expanded within a pipe joint.

Thus, as described above, the cylindrical member 9 is positioned into the joint portion 3, and then the worker restores the cylindrical member 9 to its original state as shown in FIG. 8(b). By this operation, the ends of belt members 10 just slightly overlap and the members 10 lightly contact the inside peripheral surfaces of the pipes 1 and 2 with their outside peripheral surfaces. In this state, the worker respectively fits said circular expanding members 11 inside both the ends a and a of said cylindrical member 9, and by a proper method, the expanding members 11 are expanded in diameter. In this case, if radially inward circular protrusions 26 are provided inside both the ends a and a of the cylindrical member 9, the fitting of said expanding members 11 into their positions can be made easily. An example of a tool 22 for expanding said expanding members 11 in diameter is shown in FIG. 7. In the example, plural threaded shafts 24 are threaded with a circular body 23 having a diameter which allows its entry into the expanding members 11, and the shafts 24 can freely move radially in both directions. The outer ends of said threaded shafts 24 are attached to convex members 25. The respective threaded shafts 24 are rotated to move the members 25 radially outward thereby increasing the diameter of said expanding members 11. With regard to another example of the tool 22 for expanding the expanding members 11 in diameter, a circular bag arranged to contact the inside surface of the expanding member 11 can be used and expanded pneumatically, hydraulically, etc. for radially expanding the expanding member 11.

Thus, as the expanding members 11 are expanded as described above, both the ends a and a of the cylindrical member 9 are also expanded radially outwardly to press the belt members 10 against the inside portions of the pipes on both sides of the joint 3', and the pressure squeezes said belt members 10 thereby making the bonding agent contained in the belt members 10 ooze, and also the longitudinal inside and outside circular protrusions 18 and 19 forming the grooves 20 for said belt members 10 are pressed against the inside portions of the pipes 1 and 2. Since the longitudinal inside and outside circular protrusions 18 and 19 are pressed against the inside portions of the pipes 1 and 2 in this way, the grooves 20 are sealed thereby and are filled with the bonding agent. In this state, the expanding members are fixed in diameter and allowed to stand for a certain time so as to harden the bonding agent. Thus, the peripheral outside surfaces of both the ends a and a of the cylindrical member 9 are bonded to the respective inside surfaces of the pipes 1 and 2 at the location of said grooves 20 in an airtight and watertight state. After the bonding agent is hardened, said expanding members 11 may be removed from the cylindrical member 9 or they may be left as they are.

Thus, in the present invention, the peripheral outside surfaces of both the ends a and a of the cylindrical member covering the inside periphery of the joint 3' of the pipes 1 and 2 are bonded by a bonding agent to the respective inside peripheral surfaces of the pipes 1 and 2 in an airtight and watertight state. Therefore, even if the joint 3' of the joint portion 3 is separated or bent, the sealed portions do not move due to the bonding, and instead the intermediate portion b of said cylindrical member 9 is elastically deformed so as to compensate for the movement of the joint portion 3. For this reason, both the ends a and a of the cylindrical member 9, i.e. the sealed portions, do not move, and thus the leakage of the fluid flowing inside the pipes is prevented. Moreover, if the radial wall thickness of the intermediate portion b is thinner than that of both the ends a and a, the portion b is more likely to elastically deform than both the ends a and a. As in case of this embodiment, only the intermediate portion b is liable to elastically deform even when the joint portion moves, as described above. This causes both the ends a,a to be substantially free from longitudinal compression and tension forces thereby making the above mentioned sealing effect more remarkable. With regard to other means for making the intermediate portion b more liable to elastically deform than both the ends a and a, for example, by applying different vulcanizing conditions to the intermediate portion b as compared to both the ends a and a, the intermediate portion b can be made soft and both the ends a and a, hard. Furthermore, with regard to the second embodiment shown in FIG. 2, reinforcing members 27 less elastic than the elastic material of the cylindrical member 9 can be embedded in both the ends a and a so as to make the intermediate portion relatively liable to elastically deform.

In addition to the above features, when both the ends a and a of the cylindrical member 9 are bonded to the respective inside peripheral surfaces of the pipes 1 and 2 by a bonding agent, the longitudinal inside and outside circular protrusions forming the annular grooves 20 for receiving the belt members 10 are also pressed against the inside peripheral portions of the pipes 1 and 2 thereby enhancing the sealing effect via the protrusions 18 and 19.

Figure 2A:
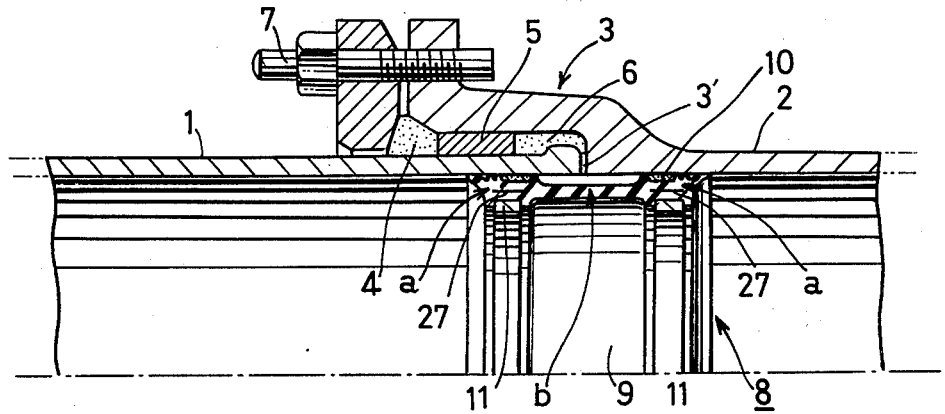
FIG. 2(a) is a longitudinal sectional view showing the leak preventing device operatively positioned at the joint of two pipes.
Figure 2B:
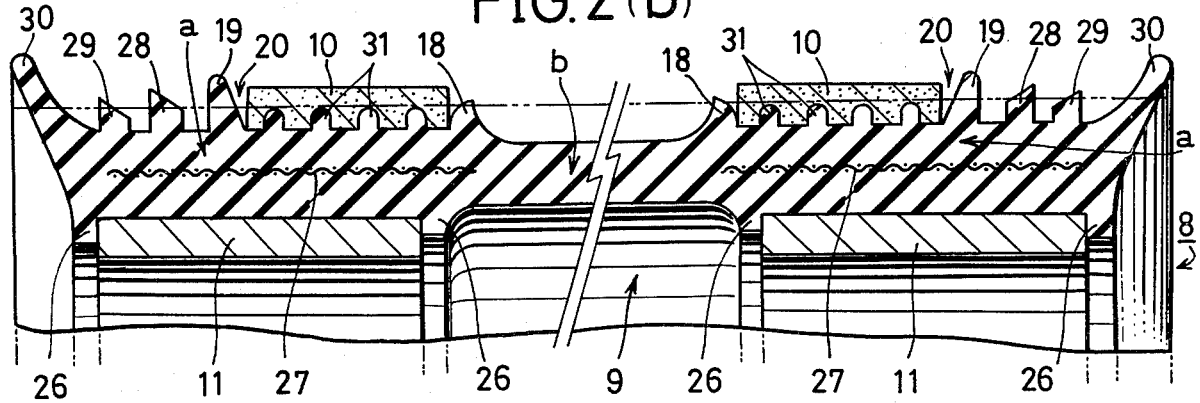
FIG. 2(b) is a longitudinal sectional view showing the leak preventing device only.
Figure 3A:
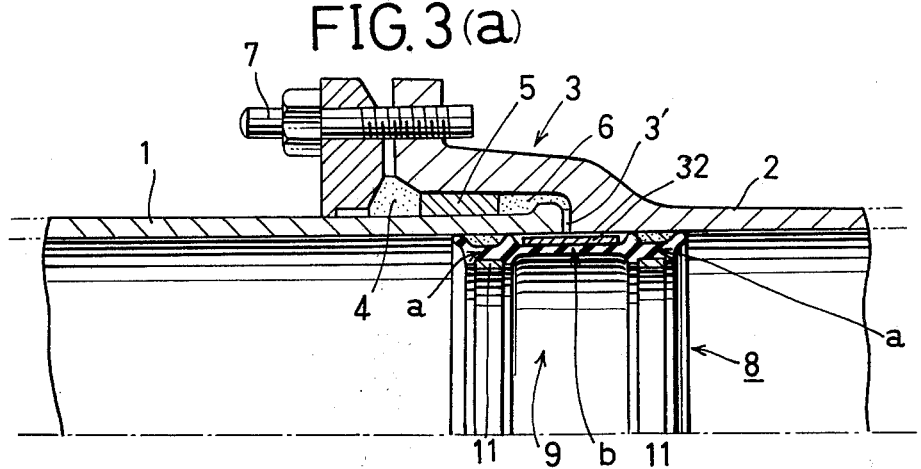
FIG. 3(a) is a longitudinal sectional view showing the leak preventing device operatively positioned at the joint of two pipes.
Figure 3B:
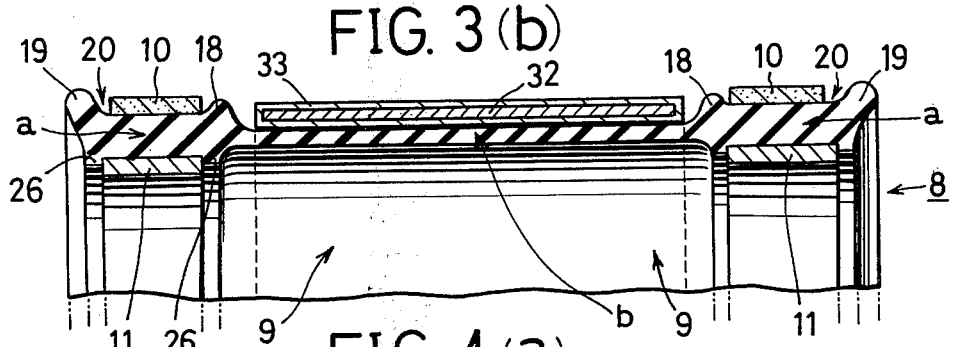
FIG. 3(b) is a longitudinal sectional view showing the leak preventing device only.

FIG. 2 shows a second embodiment. In the second embodiment, in addition to that comprising the first embodiment, plural radially outward protrusions 28 and 29 are formed on the outside periphery of said grooves 20 such that the radial lengths of the longitudinal inside protrusions 28 are slightly longer than that of the longitudinal outside protrusions 29. Also longitudinal end protrusions 30 are formed in the member 9. Furthermore, in this embodiment, uneven surface portions 31 for reinforcing bonding are formed at both the ends a and a of said cylindrical member 9. Said uneven portions 31 can be formed by annular radial protrusions as shown in FIG. 2(b) or by an uneven or stepped surface. In any formation, the outermost surfaces of the portions 31 should not radially exceed the dotted line in FIG. 2(b) which represents the inner peripheral surface of the pipes 1 and 2.

In this arrangement, the leak preventing device of this embodiment is fitted into the joint portion 3 as in the previous embodiment. In this embodiment, as mentioned before, the outer peripheral surfaces of both the ends a and a of said cylindrical member 9 are bonded at the location of the grooves 20 to the inside peripheral surfaces of the pipes 1 and 2 by a bonding agent, and the longitudinal inside and outside protrusions 18 and 19 forming the grooves 20, said plural protrusions 28 and 29, and the longitudinal end protrusions 30 are pressed against the inside peripheral surfaces of the pipes 1 and 2. Therefore, in addition to the sealing effect of the first embodiment, the sealing effect of the second embodiment, via the plural protrusions 28 and 29 and the longitudinal end protrusions 30, provides a very sophisticated leak preventing device. Specifically, leakage prevention is extremely effective in the second embodiment where the plural protrusions 28 and 29 are arranged in the order of increasing radial width from the longitudinal outside to the inside, and longitudinal outside protrusions 19 are provided longitudinally inside of the end protrusions 30. Therefore, for example, if a high pressure gas flowing in the pipes 1 and 2 leaks at one of said end protrusions 30, the leaking gas leaks successively through the protrusions, thereby causing successive reductions in pressure. Also, due to the sealing effect of a bonding agent, leakage prevention is further effectuated in this second embodiment. Since said protrusions 28 and 29 and the end protrusions 30 are in pressurized contact with the inside peripheral surfaces of the pipes 1 and 2, leakage prevention is facilitated by a multiple sealing. However, this multiple sealing facilitated by the protrusions is not limited to the specific structure of the second embodiment. For example the number of sets of protrusions like said protrusions 28 and 29 can be as many as needed, and their radial widths can be arbitrary; for example, they can be as wide as said outside protrusions 19. The term longitudinal end protrusions 30 means protrusions formed at the longitudinal ends, and in the first embodiment of FIG. 1 and the third embodiment of FIG. 3, the longitudinal outside protrusions 19 are longitudinal end protrusions. Furthermore in the second embodiment, the uneven portions 31 for reinforcing bonding are formed in the portions corresponding to the outer periphery of the grooves 20 at both the ends a and a of said cylindrical member. Therefore, the bonding agent squeezed out of the belt members 10 can be very effective when utilized in conjunction with the uneven portions 31 at both the ends a and a, thereby further improving the above mentioned bonding effect. Furthermore, in the second embodiment, a reinforcement 27 less elastic than the material forming the cylindrical member 9, for example metal net or cotton cloth, is embedded at each of the ends a and a so as to increase the hardness of both the ends a and a, and to make the intermediate portion b relatively susceptible to elastic deformation. Therefore, even if the joint 3' of the joint portion 3 is separated or bent, as mentioned before, only the intermediate portion b is elongated or bent while leaving the bonded portions at both the ends a and a relatively free from strong tension and compression forces. Also because of the large resistance against these forces, the sealed portions do not move at all, thereby good sealing, a very important feature of this embodiment, can be maintained.

As is obvious from the above description, the intermediate portion b absorbs the movement of the joint portion by its own elastic deformation such as elongation or bending, thereby not transferring the movement of the joint portion 3 to both the ends a and a to further enhance the sealing of the joint 3'. Therefore, the intermediate portion b should be as elastically deformable as possible. However, if it is too elastically deformable, the joint 3' may be too easily separated or the intermediate portion b may become to elongating causing it to become too thin thereby allowing the intermediate portion to expand by the inside gas pressure of the pipes 1 and 2 which may cause it to burst. The structure for preventing such danger is shown in the embodiment 3 shown in FIG. 3. In this embodiment, a swell preventing cylindrical member 32 for preventing the radial expansion of said intermediate portion b is positioned around the intermediate portion b of the cylindrical member 9. The swell preventing member 32 is a cylinder made of a flexible material with a predetermined rigidity and tensile strength, for example, cloth or canvas or cotton. The swell preventing member 32 is desirably covered by a covering 33 for protecting its surface from the effect of the bonding agent which may inhibit the elastic deformation of the intermediate portion b when the bonding agent squeezed out in the grooves 20 permeates beyond the inside protrusions 18 to the intermediate portion b. However, the covering 33 is not always required if the bonding agent cannot permeate to the intermediate portion b because of the inside protrusions 18.

Thus, in this embodiment, even if the joint 3' is separated such that the intermediate portion b of the cylindrical member 9 is elongated so that it becomes very thin, the expansion and bursting of the portion b by the inside gas pressure of the pipes 1 and 2 can be effectively prevented since the radial swelling of the intermediate portion b is prevented by the swell preventing member. Since the intermediate portion b is supported so as to prevent its swelling by the swell preventing member 32, the elastic deformability of the intermediate portion b can be maintained, and this improves the effect described in the previous two embodiments.

Figure 4A:
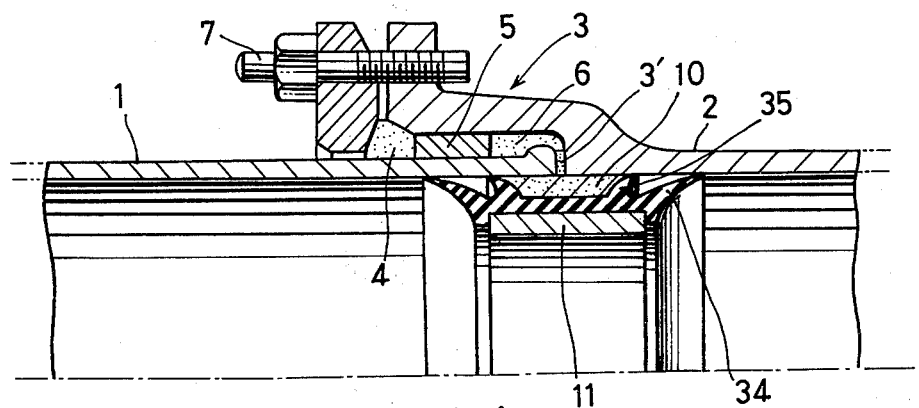
FIG. 4(a) is a longitudinal sectional view showing the leak preventing device operatively positioned at the joint of pipes.
Figure 4B:
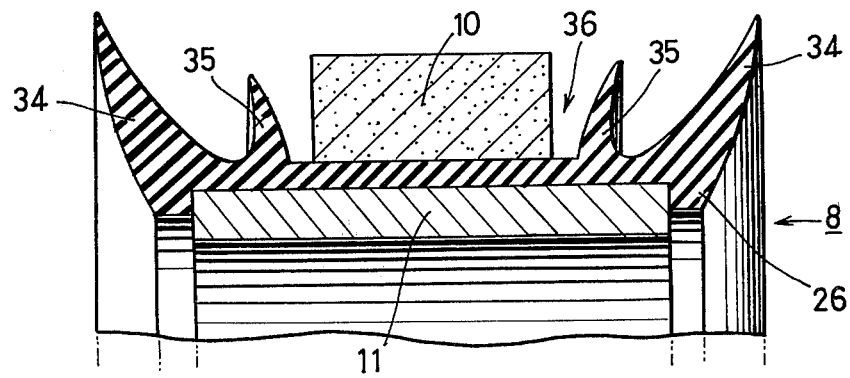
FIG. 4(b) is a longitudinal sectional view showing the leak preventing device only.

FIG. 4 shows an embodiment applying the technical concepts of the leak preventing member 8 of the present invention so as to repair a leaking portion of the joint 3' of the joint portion 3. This embodiment comprises a cylindrical member 9 integrally made of an elastic material so as to cover the inner periphery of the joint 3' of the pipes 1 and 2, a belt member 10 impregnated with a bonding agent which is squeezed out by pressure, a circular expanding member 11 for expanding said cylindrical member 9, and longitudinal end protrusions 34 formed at both the ends of said cylindrical member 9. The belt member 10 is wound around the intermediate portion b of said cylindrical member 9, and said cylindrical member 9 is expanded outwardly by said expanding member 11 to force said belt member 10 against the inside peripheral portions of the pipes 1 and 2 at the joint 3'. This pressure squeezes said belt member 10, causing the bonding agent to ooze thus filling the leaking joint 3', and at the same time presses said end protrusions 34 against the inside peripheral portions of the pipes 1 and 2 on both sides of the joint 3'. In this example, the bonding agent contained in the belt member 10 is squeezed out so as to fill and close the leaking portion, and the end protrusions 34 of the cylindrical member 9 on both sides of the joint are pressed against the inside peripheral portions of the pipes 1 and 2 on both sides of the joint 3' for attaining an airtight and watertight state. Therefore, due to the sealing caused by the filling of the leaking portion by the bonding agent and the contact of the end protrusions with the pipes inner peripheries the repair of the leaking portion is effectuated. In this example, if a pair of annular protrusions 35 are provided longitudinally inside of said end protrusions 34 and around said cylindrical member 9, so as to define a groove 36 for the belt member 10, the bonding agent squeezed out of said belt member 10 fills the groove which is pressed toward the leaking portion of the joint 3' thereby improving the effect of the bonding agent, and at the same time protrusions 35 are in contact with the pipes inner peripheries. Thus, two or three leak prevention structures can be incorporated into this embodiment of the present invention.

The leak preventing device of the present invention, as described above in detail, comprises a cylindrical member integrally made of an elastic material for covering the inner periphery of the joint of pipes from belt members impregnated with a bonding agent to be squeezed out by pressure, and circular expanding members for expanding said cylindrical member and positioned inside of said cylindrical member.

Said belt members are respectively wound around the outside peripheral surface of said cylindrical member at both longitudinal ends and said respective expanding members are brought into contact with the inside peripheral surface of said cylindrical member at both the ends, so that by expanding said cylindrical member radially outwardly at both the ends by said respective expanding members, said respective belt members are pressed against the inside peripheral portions of the pipes on both sides of said joint, thereby squeezing the bonding agent from said belt members by such pressure to thereby attain airtight and watertight bonding between the outside peripheral surface of the cylindrical member covering the joint of pipes and the inside peripheral surfaces of the pipes. Therefore, even if a joint is separated or bent, for example by an earthquake or ground movement, both ends of the cylindrical member as sealed portions do not move at all due to the effect of the bonding while the intermediate portion of the cylindrical member elastically deforms to absorb the movement of the joint portion 3 thereby facilitating the prevention of a leakage of fluid without reducing the sealing effect. This is one remarkable feature of the present invention. The sealing effect can be made more remarkable by making the intermediate portion of the cylindrical member more susceptible to elastic deformation than both the ends. Furthermore in the present invention, the peripheral outside surfaces of the cylindrical member at both ends is bonded to the inside peripheral surfaces of pipes by compressing the belt members impregnated with a bonding agent by radially expanding the cylindrical member. Therefore the present invention is simple and reliable, and the bonding can be easily facilitated; this is a second remarkable feature of the present invention.

What is claimed is:

1. A device for forming an airtight and watertight seal between the joint of two pipes, said device comprising:
   an integral cylindrical member made of an elastic material and having a longitudinal intermediate portion, said cylindrical member being inside of and in contact with the inner peripheral surfaces of the respective ends of two pipes that form a joint between the two pipes, said intermediate portion being radially adjacent to the joint of the two pipes;
   two belt members, each respectively positioned around the radial outer peripheral surface of a longitudinal end of said cylindrical member and impregnated with a bonding agent for, when pressure is exerted thereon, oozing the bonding agent therefrom; and
   two expanding members, each respectively positioned inside the inner peripheral surface of a longitudinal end of said cylindrical member for radially expanding the respective cylindrical member longitudinal end for exerting pressure on one of said belt members for causing the bonding agent thereof to be oozed therefrom, whereby the radial outer peripheral surfaces of the longitudinal ends of said cylindrical member are respectively bonded to the inner peripheral surfaces of the two pipe ends, thereby forming an airtight and watertight seal between the joint of the two pipes.

2. A device for forming an airtight and watertight seal between the joint of two pipes, said device comprising:
   an integral cylindrical member made of an elastic material and having an intermediate portion being more radially and axially elastically deformable than the longitudinal ends of said cylindrical member, said cylindrical member being inside of and in contact with the inner peripheral surfaces of the respective ends of two pipes that form a joint between the two pipes, said intermediate portion being radially adjacent to the joint of the two pipes;
   two belt members, each respectively positioned around the radial outer peripheral surface of a longitudinal end of said cylindrical member and impregnated with a bonding agent for, when pressure is exerted thereon, oozing the bonding agent therefrom; and
   two expanding members, each respectively positioned inside the inner peripheral surface of a longitudinal end of said cylindrical member for radially expanding the respective cylindrical member longitudinal end for exerting pressure on one of said belt members for causing the bonding agent thereof to be oozed therefrom, whereby the radial outer peripheral surfaces of the longitudinal ends of said cylindrical member are respectively bonded to the inner peripheral surfaces of the two pipe ends, thereby forming an airtight and watertight seal between the joint of the two pipes.

3. A device as claimed in claim 1 or 2, wherein:
   each of the longitudinal ends of said cylindrical member has a longitudinal inside and outside circumferentially extending radial protrusion for, when the longitudinal end is expanded, sealing with the inner peripheral surface of the corresponding pipe end; and
   each of the longitudinal ends of said cylindrical member has an annular groove between said inside and outside radial protrusions for accommodating one of said belt members.

4. A device as claimed in claim 1, wherein each of the longitudinal ends of said cylindrical member has a plurality of outside circumferentially extending radial protrusions longitudinally outwardly spaced from the corresponding one of said belt members for, when the longitudinal end is expanded, sealing with the inner peripheral surface of the corresponding pipe end.

5. A device as claimed in claim 1, wherein:
   each of the longitudinal ends of said cylindrical member has a plurality of outside circumferentially extending radial protrusions longitudinally outwardly spaced from the corresponding one of said belt members and a longitudinal end circumferentially extending radial protrusion outwardly spaced from said outside radial protrusions; and
   each of said outside radial protrusions has a greater radial width than the outwardly adjacent successive longitudinally outside radial protrusion.

6. A device as claimed in claim 1, wherein the radial outer peripheral surface of each of the longitudinal ends of said cylindrical member radially adjacent to one of said belt members is an uneven surface for respectively facilitating the bonding of said cylindrical member to the inner peripheral surfaces of the two pipes.

7. A device as claimed in claim 2, wherein said intermediate portion of said cylindrical member has a smaller radial thickness than the longitudinal ends of said cylindrical member.

8. A device as claimed in claim 2, wherein said intermediate portion of said cylindrical member is more flexible than the longitudinal ends of said cylindrical member for allowing said intermediate portion to be more radially and axially elastically deformable than the longitudinal ends.

9. A device as claimed in claim 2, wherein the longitudinal ends of said cylindrical member have reinforcing material which is less elastic than the other material which comprises said cylindrical member for allowing said intermediate portion to be more radially and axially elastically deformable than the longitudinal ends.

10. A device as claimed in claims 1 or 2, further comprising a cylindrical swell preventing member positioned around the outer peripheral surface of said intermediate member for preventing the substantial outward radial deformation of said intermediate member.

11. A device as claimed in claim 10, wherein said cylindrical swell preventing member has a protective covering on the outside surfaces thereof for protecting said cylindrical swell member from the effects of a bonding agent.

* * * * *